(12) United States Patent
Calabrese (10) Patent No.: US 9,869,764 B2
(45) Date of Patent: Jan. 16, 2018

(54) MULTIPLE-SWATH STRIPMAP SAR IMAGING

(71) Applicant: Thales Alenia Space Italia S.p.A. Con Unico Socio, Rome (IT)

(72) Inventor: Diego Calabrese, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 351 days.

(21) Appl. No.: 14/766,222

(22) PCT Filed: Feb. 8, 2014

(86) PCT No.: PCT/IB2014/058873
§ 371 (c)(1),
(2) Date: Aug. 6, 2015

(87) PCT Pub. No.: WO2014/122625
PCT Pub. Date: Aug. 14, 2014

(65) Prior Publication Data
US 2015/0378018 A1   Dec. 31, 2015

(30) Foreign Application Priority Data
Feb. 8, 2013   (IT) ............................... TO2013A0108

(51) Int. Cl.
*G01S 13/90* (2006.01)
*G06T 1/00* (2006.01)
*G06T 7/60* (2017.01)

(52) U.S. Cl.
CPC .......... *G01S 13/9035* (2013.01); *G01S 13/90* (2013.01); *G06T 1/0007* (2013.01); *G06T 7/60* (2013.01);
(Continued)

(58) Field of Classification Search
CPC .. G01S 13/90; G01S 13/9035; G01S 13/9094; G01S 2013/9041; G01S 2013/9052; G01S 2013/907
See application file for complete search history.

(56) References Cited

U.S. PATENT DOCUMENTS 5,394,151 A * 2/1995 Knaell ................. G01S 7/4021
342/25 F
7,145,498 B2 * 12/2006 Cho ....................... G01S 13/90
342/161
(Continued)

FOREIGN PATENT DOCUMENTS

DE       10319063      11/2004
IT    TO2013A000108    2/2013

OTHER PUBLICATIONS

Curlander, J.C. et al., Synthetic Aperture Radar: Systems and Signal Processing, Wiley Series in Remote Sensing, Wiley-Interscience, 1991 (abstract and table of contents only).
(Continued)

*Primary Examiner* — Peter M Bythrow
(74) *Attorney, Agent, or Firm* — McCarter & English, LLP (57) ABSTRACT

A SAR imaging method is provided that performs N SAR acquisitions in stripmap mode of areas of the earth's surface by means of a synthetic aperture radar transported by an aerial or satellite platform and which includes a single, non-partitioned antenna and a single receiver coupled to the single, non-partitioned antenna, N being an integer greater than one. Each SAR acquisition in stripmap mode is performed using a respective squint angle with respect to the flight direction of the synthetic aperture radar and a respective elevation angle with respect to the nadir of the synthetic aperture radar. The method may further generate SAR images of areas of the respective swath observed via the
(Continued)

SAR acquisition in stripmap mode. All SAR images have the same azimuth resolution that is equal to half the physical or equivalent length along the azimuth direction of the single, non-partitioned antenna of the synthetic aperture radar.

5 Claims, 4 Drawing Sheets (52) U.S. Cl.
CPC ............... *G01S 2013/9041* (2013.01); *G06T 2207/10044* (2013.01); *G06T 2207/30181* (2013.01)

(56) References Cited

U.S. PATENT DOCUMENTS

| | | | | |
|---|---|---|---|---|
| 7,532,150 | B1* | 5/2009 | Abatzoglou | G01S 13/9035 342/25 A |
| 7,705,767 | B2* | 4/2010 | Fujimura | G01S 13/9035 342/175 |
| 8,049,657 | B2* | 11/2011 | Prats | G01S 13/9035 342/25 A |
| 8,552,905 | B2* | 10/2013 | Jin | G01S 13/9035 342/25 R |
| 8,947,292 | B2* | 2/2015 | Andersson | G01S 13/90 342/25 A |
| 2010/0207808 | A1* | 8/2010 | Prats | G01S 13/9035 342/25 F |
| 2011/0175770 | A1* | 7/2011 | Boufounos | G01S 13/9035 342/25 A |
| 2012/0105276 | A1* | 5/2012 | Ryland | G01S 13/9035 342/25 F |
| 2012/0319892 | A1* | 12/2012 | Calabrese | G01S 13/9023 342/25 C |
| 2014/0077989 | A1* | 3/2014 | Healy, Jr. | G01S 13/90 342/25 F |

OTHER PUBLICATIONS

Currie et al., Wide-swath SAR, IEE Proceedings of Radar and Signal Processing, vol. 139, No. 2, pp. 122-135, 1992.
Franceschetti, G. et al., Synthetic Aperture RADAR Processing, CRC Press, Mar. 1999 (abstract and table of contents only).
Krieger, G. et al., Advanced Concepts for High-Resolution Wide-Swarth SAR Imaging, 8th European Conference on Synthetic Aperture Radar, pp. 524-527, 2010.
Mittermayer, J. et al., Bidirectional SAR Imaging Mode, IEEE Transactions on Geoscience and Remote Sensing, vol. 51, No. 1, pp. 601-604, 2013.
Italian Search Report and Written Opinion for TO2013A000108 dated Oct. 2, 2013.
PCT International Search Report and Written Opinion for PCT/IB2014/058872 dated May 27, 2014.
PCT/IB2014/058872, Feb. 8, 2014, WO/2014/122624.

\* cited by examiner

MULTIPLE-SWATH STRIPMAP SAR IMAGING

TECHNICAL FIELD OF INVENTION

The present invention relates to remote sensing by means of Synthetic Aperture Radar (SAR) in general and, in particular, to an innovative method for multiple-swath stripmap SAR imaging.

STATE OF THE ART

Figure 1:
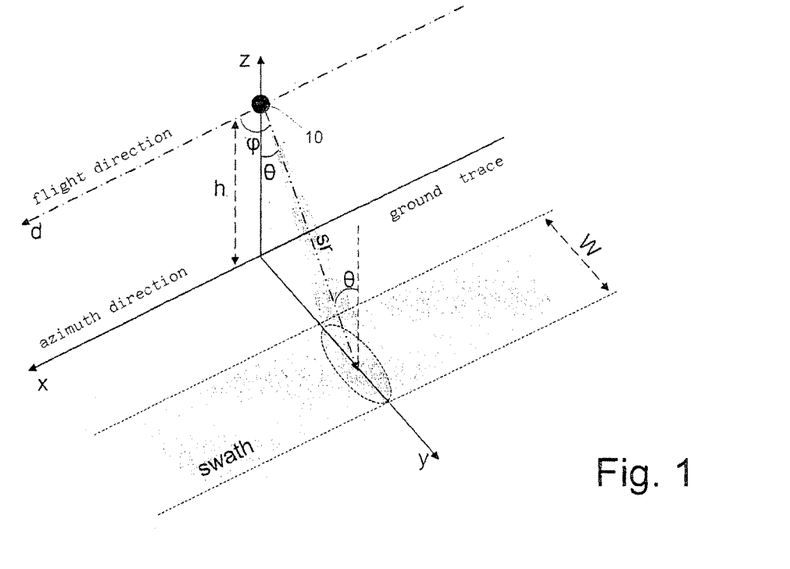
FIGS. 1 and 2 schematically show a typical acquisition geometry for SAR images in stripmap mode.

A typical reference geometry for generating SAR images of the earth's surface is shown in FIG. 1. With regard to this, it is wished to underline the fact that in FIG. 1 (and also in the following figures that will be presented and described hereinafter), the earth's surface is (and will be) shown "flat" only for convenience and simplicity of illustration and description, without any loss of generality.

In particular, FIG. 1 schematically shows a synthetic aperture radar (hereinafter called a SAR sensor, for simplicity of description) 10 that moves along a flight direction d at an altitude h (with respect to the earth's surface) assumed to be substantially constant. As is known, the altitude h of the SAR sensor 10 is measured along a nadir direction z that passes through said SAR sensor 10 (in particular it passes through the phase centre of the antenna of the SAR sensor 10) and is orthogonal to the earth's surface and the flight direction d. Conveniently, the SAR sensor 10 is transported in flight/orbit by an aerial/space platform (not shown in FIG. 1 for simplicity of illustration), such as, for example, an aircraft, or an unmanned aerial vehicle (UAV), or a satellite. The ground trace of the flight direction d identifies an azimuth direction x that is parallel to said flight direction d and orthogonal to the nadir direction z, while a cross-track direction y, which is orthogonal to both the nadir direction z and the azimuth direction x, together with the azimuth direction x, identifies an x-y plane tangential to the earth's surface. In use, by means of an opportune antenna (not shown in FIG. 1 for simplicity of illustration), the SAR sensor 10 transmits radar pulses and receives the associated back-scattered signals in an acquisition direction sr that identifies the slant range and which forms an elevation angle θ with the nadir direction z and a squint angle φ with the flight direction d (or, equivalently, with the azimuth direction x) that, in the SAR acquisition geometry shown in FIG. 1, is equal to 90°.

Figure 2:
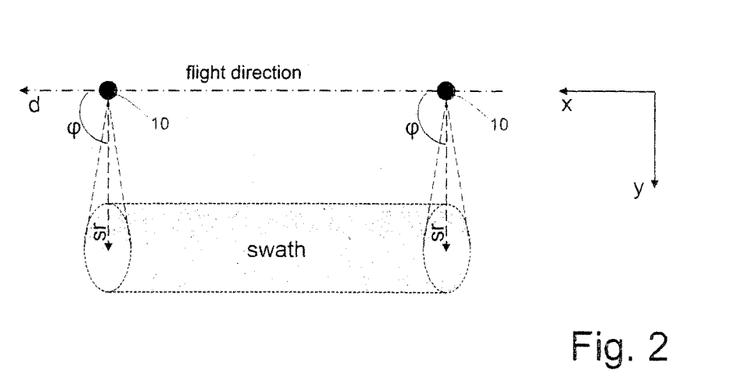

In particular, the SAR acquisition geometry shown in FIG. 1 regards the so-called stripmap mode, in which the SAR sensor illuminates a strip of the earth's surface, known as a swath, with radar pulses and then receives the associated back-scattered signals therefrom, said swath principally extending parallel to the azimuth direction x and having a given width W along the cross-track direction y. For greater clarity, FIG. 2 shows the geometry of SAR acquisition in stripmap mode in the x-y plane, where it is possible to observe how the squint angles φ are all the same (in particular, in the example shown in FIG. 2, the a squint angles φ are all right angles).

SAR technology can be considered a mature technology. In fact, nowadays there are countless articles, manuals, patents and patent applications that describe the characteristics and potential thereof; in this regard, reference can be made to:

- the article by Josef Mittermayer et al. entitled "*Bidirectional SAR Imaging Mode*", IEEE Transactions on Geoscience and Remote Sensing, vol. 51, no. 1, 1 Jan. 2013, pages 601-614, which hereinafter will be indicated, for simplicity of description, as Ref1 and which describes a mode for creating bidirectional SAR images;
- German patent application DE 103 19 063 A1, which hereinafter will be indicated, for simplicity of description, as Ref2 and which relates to a SAR antenna method and system having a plurality of antenna elements for generating multiple SAR beams;
- the article by A. Currie et al. entitled "*Wide-swath SAR*", IEE Proceedings of Radar and Signal Processing, vol. 139, no. 2, 1 Apr. 1992, pages 122-135, which hereinafter will be indicated, for simplicity of description, as Ref3 and which describes various methods for widening the swath observable via a SAR;
- the article by G. Krieger et al. entitled "*Advanced Concepts for High-Resolution Wide-Swath SAR Imaging*", 8th European Conference on Synthetic Aperture Radar, 7 Jun. 2010, pages 524-527, which hereinafter will be indicated, for simplicity of description, as Ref4 and which presents various concepts regarding multi-channel SAR systems for creating high-resolution wide-swath SAR images;
- the book by J. C. Curlander and R. N. McDonough entitled "*Synthetic Aperture Radar: Systems and Signal Processing*", Wiley Series in Remote Sensing, Wiley-Interscience, 1991, which hereinafter will be indicated, for simplicity of description, as Ref5 and which is a manual on SAR systems; and
- the book by G. Franceschetti and R. Lanari entitled "*Synthetic Aperture RADAR Processing*", CRC Press, March 1999, which hereinafter will be indicated, for simplicity of description, as Ref6 and which is another manual on SAR systems.

As is known, the azimuth resolution for a SAR acquisition in stripmap mode is a function of the angular aperture (or angular difference—delta angle) with which a target is observed by the SAR sensor; or, equivalently, the azimuth resolution can also be seen as a function of the time difference (delta time), related to the velocity of the SAR sensor, with which the target is observed. In particular, the azimuth resolution can be expressed by the following equation (for further details, please refer to Ref3, Ref5 and Ref6):

$$res = \frac{0.886\lambda}{2*\text{delta\_angle}},$$

where res indicates the azimuth resolution, λ indicates the wavelength used by the SAR sensor and delta_angle indicates the angular aperture (or angular difference—delta angle) with which the target is observed by the SAR sensor.

Assuming the angle as a 3 dB aperture (one-way) of the antenna (=0.886λ/L, where L indicates the physical or equivalent length along the azimuth direction of the antenna of the SAR sensor), the constraint traditionally associated with the azimuth resolution for the stripmap mode can be obtained, which is equal to L/2 (for further details, please refer to Ref3, Ref5 and Ref6).

Figure 3:
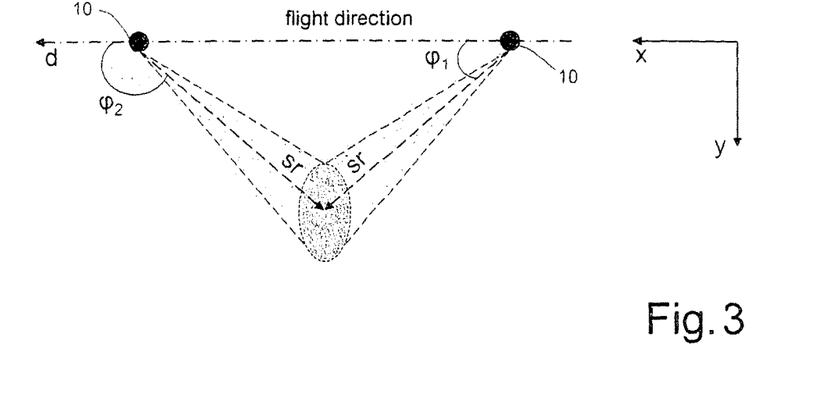
FIG. 3 schematically shows a typical acquisition geometry for SAR images in spotlight mode.

Currently, very wide antenna beams are used to improve the azimuth resolution, these being achieved through the use of antennas of small size or under-illuminated or with amplitude and/or phase modulation such as to reduce the equivalent size, or by using the so-called spotlight mode, the acquisition logic of which is schematically illustrated in FIG. 3.

In particular, as shown in FIG. 3, the SAR acquisition logic in spotlight mode envisages using a continuous, or quasi-continuous, steering of the antenna beam during the flight movement of the SAR sensor 10 (by dynamically adjusting the value of the squint angle φ) so as to illuminate a same area of interest with the radar pulses and then receive the associated back-scattered signals therefrom, in this way increasing the persistence time of the SAR sensor 10 on said area of interest and thus improving the azimuth resolution.

Both of the above-stated methodologies used for improving the azimuth resolution suffer from some drawbacks. In particular, the use of very wide antenna beams requires using very high transmission powers, while the spotlight mode introduces limitations on the azimuth length of the swaths.

As indicated in the literature, mathematical relations exist that link the parameters of the operational modes. In particular, azimuth sampling dictates that the transmission/reception pulse repetition frequency (PRF) is linked to the size of the beam and to the velocity of the SAR sensor (for further details, please refer to Ref3, Ref5 and Ref6):

$$PRF > \frac{2\alpha v}{L},$$

where α is a parameter dependent on the desired level of ambiguity, v indicates the velocity of the SAR sensor and L indicates the physical or equivalent length along the azimuth direction of the antenna of the SAR sensor.

The value of PRF limits the extension of the measured area (swath) in range (for further details, please refer to Ref3, Ref5 and Ref6):

$$\Delta R < \left(\frac{1}{PRF} - 2\tau\right)\frac{c}{2},$$

where ΔR indicates the extension of the measured area (swath) in range, τ indicates the time interval (or duration) of the pulse transmitted and c indicates the speed of light.

In order to exploit the capabilities of a SAR system to the maximum, in addition to the stripmap and spotlight modes, various other techniques have proposed over the years for using SAR sensors, which can be grouped into three main modes:
- burst mode;
- space-division mode; and
- angle-division mode.

The main burst mode is the ScanSAR mode, which divides time into synchronous bursts (i.e. with a regular rate). A scene portion at the antenna's nominal PRF is acquired in each burst, in such a way that the azimuth spectrum is correctly sampled (for further details, please refer to Ref3, Ref5 and Ref6), but for a shorter time (and therefore a smaller delta angle). This time division enables switching the beam, in subsequent bursts, in other directions in order to increase the swath in range. In practice, the "azimuth time" is divided into $N_b$ bursts and a different strip is acquired at each burst. The greatest contraindication of this mode is that by reducing the acquired delta angle, the azimuth resolution deteriorates. In particular, the constraint of continuous coverage that guarantees the absence of "holes" in the strips implicates that the best azimuth resolution cannot be less than (i.e. better than) a certain amount (for further details, please refer to Ref3, Ref4, Ref5 and Ref6); in particular it is found that:

$$res_{ScanSar} \geq (N_b+1) res_{Strip}$$

where $res_{ScanSar}$ indicates the ScanSAR resolution and $res_{Strip}$ indicates the stripmap reference resolution (i.e. L/2).

The TOPS mode (for further details, please refer to Ref4) is also numbered among the burst modes; this mode exploits the azimuth steering capability and requires a scanning direction opposite to that of the spotlight mode, i.e. comparable to a sweep rather than a re-centring. That is, in each burst, the initial azimuth steering ensures that the SAR sensor "looks" backwards and then points forwards at the end of the burst. This ensures that, unlike the conventional ScanSAR mode, each target is illuminated by the entire antenna pattern and this enables equalizing the radiometric response and the azimuth ambiguities. As happens with the prescribed ScanSAR mode, in the TOPS mode (which is also a burst mode) as well, the targets are always seen by the sensor with a smaller delta angle (or delta time) than that typical of the stripmap mode.

It follows that also the TOPS mode, just like ScanSAR (even if with different equations/constraints with respect to the traditional ScanSAR), allows extending the swath in range at the cost of degrading the azimuth resolution with respect to the stripmap mode. These concepts are summarized in Ref4, where in the introduction it is stated: "Examples are the ScanSAR (or TOPS) mode which enables a wide swath at the cost of an impaired azimuth resolution and the Spotlight mode which allows for an improved azimuth resolution at the cost of a noncontiguous imaging along the satellite track".

As previously seen, the requirements of having wide swaths and high resolutions are in mutual conflict. On the one hand, a low PRF is preferred to have "more time" to acquire a wide scene in the across-track elevation plane, while on the other, a wide antenna beam would be preferred to improve the azimuth resolution. However, this last characteristic would require a high PRF, thereby being in contrast with the first requirement. In order to overcome these problems, techniques have been proposed in the past that use space-division modes, such as, for example, the Displaced Phase Centres (DPC) technique (for further details, please refer to Ref3 and Ref4), which requires the use of multiple reception antennas. This can be achieved by using multiple SAR sensors, or by segmenting a single antenna and using multiple reception systems: a wide beam is transmitted (small antenna size L) and then simultaneously received with M antennas (of small size like the one in transmission) arranged along the azimuth direction. The use of multiple reception elements allows having a larger number of azimuth samples and therefore using a lower physical PRF (for further details, please refer to Ref3 and Ref4). The biggest contraindication of this technique is the complexity; in fact, this technique requires the simultaneous use of M receivers and M "small" antennas (or a large one partitioned into M sub-blocks) and therefore requires high transmission power to achieve adequate product sensitivity. Furthermore, the literature points out some critical areas at the algorithm level regarding sensitivity to errors of knowledge of the M phase centres, as well as the effects on the ambiguity level. There are some variants in the literature that try to reduce these critical areas, such as the High Resolution Wide-Swath (HRWS) technique, which also envisages partitioning in elevation in order to "follow" the beam in elevation, thereby increasing directivity and consequently product sensitivity.

The aim of the techniques that use angle-division modes is similar to that of the techniques that use space-division modes, but the additional samples are acquired by sampling in different directions. In particular, there are two main logics: angular division in elevation and angular division in azimuth.

Angular division in elevation (with regard to this, reference can be made, for example, to the Multiple Elevation Beam (MEB) technique described in Ref4) envisages the simultaneous acquisition with multiple antenna/reception systems and a single transmitter (with wide swath), or more directive transmissions (for further details, please refer to Ref3 and Ref4). In this way, a plurality of acquisitions is obtained in stripmap mode with nominal azimuth resolutions (approximately L/2). To reduce the problems of range ambiguities, the literature proposes squinting the individual beams in elevation.

Instead, angular division in azimuth (with regard to this, reference can be made, for example, to the Single Phase Centre MultiBeam (SPCMB) technique described in Ref3) envisages transmission via a single, wide beam and simultaneous reception via M narrower beams. In this way, wide beam is obtained (improving resolution), but similarly to the spotlight mode, the single reception channels correctly sample a different angle portion. These channels will then be recombined during processing in order to obtain a synthesized delta angle M times greater, consequently improving the resolution (for further details, please refer to Ref3 and Ref4). In general, the angular division in azimuth techniques have many critical areas with respect to the level of ambiguity; in fact, the lateral lobes of the antenna in transmission and of the single antennas in reception interact, raising the level of the ambiguities.

Also in this case, the biggest contraindication of the angular division techniques is the complexity; in fact, these techniques contemplate the simultaneous use of M receivers and M "small" antennas (or a large one partitioned into M sub-blocks) and therefore require high transmission power to achieve adequate product sensitivity.

The space and angle division concepts are well summarized in Ref4, which in section 2 states: "Several proposals resolve the azimuth resolution vs. wide swath coverage dilemma by combining a multi-channel radar receiver with a small aperture transmitter illuminating a wide area on the ground. Examples are the squinted multiple beam SAR . . . , the displaced phase centre antenna (DPCA) technique . . . , the Quad Array SAR system . . . , and the High-Resolution Wide-Swath (HRWS) SAR system".

Although the aim is different, the bidirectional SAR imaging mode (BiDi—for further details, please refer to Ref1) should also be counted amongst the angle division techniques. By exploiting the azimuth grating lobes of a phased array antenna or working at different times, this mode simultaneously acquires two different images: one regarding the scene ahead and the other regarding the scene aft. The azimuth angular difference is the equivalent of a time difference, i.e. a same scene seen at different times, and therefore it is possible to identify moving objects in the scene by comparing images. It is important to underline that this technique expects the two acquisitions to be angularly separated in azimuth, i.e. it is not possible to combine the data of the two channels to reconstruct an image with higher resolution.

In the conclusion of Ref1, it is stated: "The BiDi short-term series can be used for change and velocity detection. The possibilities of the BiDi imaging mode in terms of velocity measurement is the subject of future research work. Further possible applications of BiDi include high accuracy measurement of along-track displacement by the exploitation of the widely separated Doppler spectra".

Finally, although the SAR technology can be developed with different type of antenna, the one that offers the greatest flexibility of use is the so-called "phased array" type, which allows rapid switching of the acquisition direction. Other types of antenna can be used, such as that described in Ref2, for example.

OBJECT AND SUMMARY OF THE INVENTION

The object of the present invention is that of providing a stripmap SAR imaging method that enables observing several swaths.

The above-stated object is achieved by the present invention insofar as it relates to a SAR imaging method and a SAR system, as defined in the appended claims.

In particular, the SAR imaging method according to the present invention comprises performing N SAR acquisitions in stripmap mode of areas of the earth's surface by means of a synthetic aperture radar that is transported by an aerial or satellite platform and which comprises a single, non-partitioned antenna and a single receiver coupled to said single, non-partitioned antenna, where N is an integer greater than one.

Each SAR acquisition in stripmap mode is performed using a respective squint angle with respect to the flight direction of the synthetic aperture radar, said respective squint angle being equal to, or different from, the squint angles used to perform the other N−1 SAR acquisitions in stripmap mode.

Each SAR acquisition in stripmap mode is performed using a respective elevation angle with respect to the nadir of the synthetic aperture radar, said respective elevation angle being different from the elevation angles used to perform the other N−1 SAR acquisitions in stripmap mode, thereby resulting in that each SAR acquisition in stripmap mode is related to a respective swath of the earth's surface that is different from the swaths observed via the other N−1 SAR acquisitions in stripmap mode performed.

Furthermore, each performed SAR acquisition in stripmap mode comprises respective radar transmission and reception operations that:

are time interleaved, individually or in groups, with single, or groups of, radar transmission and reception operations of the other N−1 SAR acquisitions in stripmap mode performed; and comprise the transmission and reception of respective radar beams in respective acquisition directions that are defined by the respective squint angle and by the respective elevation angle used for said SAR acquisition in stripmap mode, thereby resulting in that said respective acquisition directions are parallel to each other and not parallel to the acquisition directions of the other N−1 SAR acquisitions in stripmap mode performed.

The method further comprises generating, on the basis of each SAR acquisition in stripmap mode performed, SAR images of areas of the respective swath observed via said SAR acquisition in stripmap mode.

In particular, all the SAR images generated have one and the same azimuth resolution, which is equal to half the physical or equivalent length along the azimuth direction of the single, non-partitioned antenna of the synthetic aperture radar.

BRIEF DESCRIPTION OF DRAWINGS

For a better understanding of the present invention, some preferred embodiments, provided by way of non-limitative example, will now be described with reference to the attached drawings (not to scale), where.

DETAILED DESCRIPTION OF PREFERRED EMBODIMENTS OF THE INVENTION

The following description is provided to enable an expert in the field to embody and use the invention. Various modifications to the embodiments shown will be immediately obvious to experts and the generic principles described herein could be applied to other embodiments and applications without departing from the scope of protection of the present invention.

Thus, the present invention is not intended to be limited to just the embodiments described and shown herein, but is to be accorded the widest scope consistent with the principles and features disclosed herein and defined in the appended claims.

The present invention derives from the applicant's insight to exploit the steering capability of the antennas used in the SAR sensors in a non-conventional manner. The applicant then conceived a multi-beam and multi-temporal SAR acquisition technique that exploits the transmission and reception characteristics of a SAR sensor in time-sharing.

In particular, the idea on which the present invention is based is that of dividing a SAR acquisition in stripmap mode into N elemental acquisitions in stripmap mode (with N>1) and to combine them so as to obtain N sets of SAR images in which each set is related to a respective swath (namely so as to observe N distinct swaths with the same azimuth resolution).

In detail, a first aspect of the present invention concerns performing N different SAR acquisitions using N different elevation angles so as to observe N different swaths.

Specifically, the idea on which said first aspect of the present invention is based is that of performing several SAR acquisitions interleaved at pulse repetition interval (PRI) level, which represents the time between two consecutive transmitted pulses, in particular SAR acquisitions in which the acquisition elevation direction of the antenna changes at PRI level. In order to do this, a pulse repetition frequency (PRF, where PRF=1/PRI) is used that is N times higher with respect to the nominal PRF associated with the antenna of the SAR sensor used. Returning briefly to FIG. 1, for clarity of description, it should be remembered that the elevation angle is the angle θ between the pointing direction sr of the antenna of the SAR sensor and the nadir direction z of the SAR sensor.

By increasing the PRF by a factor of N, the N different strips will have N times less time available and therefore, in general, they will have a swath reduced by a factor of N; however, by "adding" the N different observed swaths together, the typical swath size of the classical stripmap mode is still obtained. As the individual strips are smaller by a factor of N, it is possible to use an antenna N times larger in elevation, thereby increasing product directivity, i.e. sensibility. In general, the antenna can be exploited in a more effective manner.

Furthermore, by increasing the PRF by a factor of N, N stripmap acquisitions can be obtained, individually having PRFs compatible with the antenna's size (in this way, azimuth ambiguity values are not altered).

Although the technique of SAR acquisition in stripmap mode according to the above-stated first aspect of the present invention can be used with a generic integer N greater than one, hereinafter, for simplicity of description and without loss of generality, examples will be shown for N=2, it being understood that the concepts explained hereinafter in relation to the case N=2 are also applicable mutatis mutandis in the case of a generic integer N greater than one.

Figure 4:
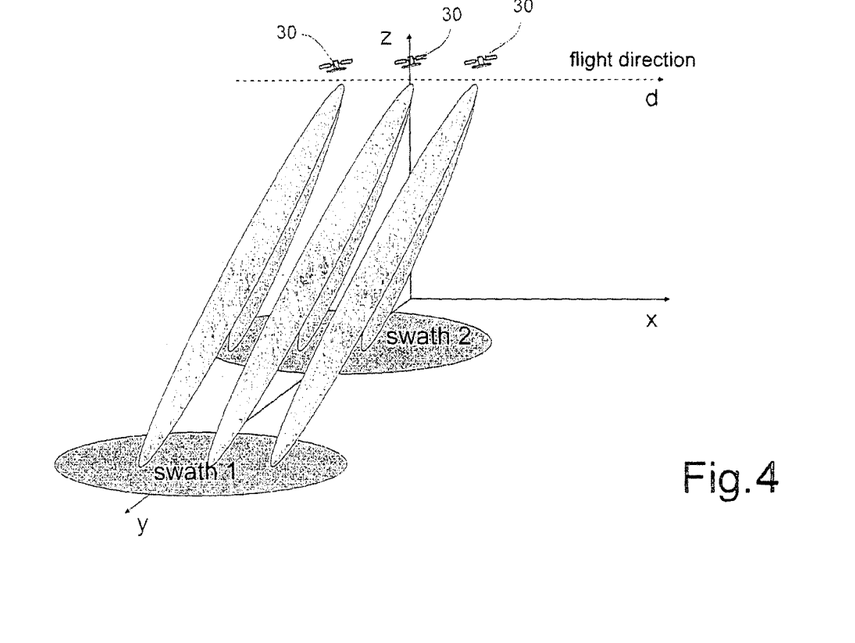
FIG. 4 schematically shows an example of logic for SAR acquisition in stripmap mode according to a first aspect of the present invention.

For a better understanding of the second aspect of the present invention, FIG. 4 schematically illustrates an example of logic for SAR acquisition in stripmap mode according to said first aspect of the present invention in the case of N=2 and in the case of a satellite application (it being understood that this SAR acquisition logic can also be advantageously used in the case of aerial platforms such as, for example, an aircraft, a UAV, or a helicopter).

In particular, FIG. 4 (in which the Cartesian reference system used substantially corresponds to that previously introduced for FIGS. 1-3) shows a satellite 30 that moves along a flight direction d and is equipped with a SAR sensor (not shown in FIG. 4 for simplicity of illustration), which, in turn, is equipped with a single, non-partitioned antenna (not shown in FIG. 4 for simplicity of illustration) that is coupled to a single receiver (not shown in FIG. 4 for simplicity of illustration) and is associated with a given nominal pulse repetition frequency $PRF_{nom}$.

In the example shown in FIG. 4, the SAR sensor is used with an operational pulse repetition frequency $PRF_{op}$ twice that of the antenna's nominal pulse repetition frequency $PRF_{nom}$ (i.e. $PRF_{op}=2PRF_{nom}$) so as to transmit successive pulses at a temporal distance $PRI_{op}=1/(2PRF_{nom})$. In particular, as shown in FIG. 4, the SAR sensor on board the satellite 30 performs a series of first SAR acquisitions using a first elevation angle and a series of second SAR acquisitions using a second elevation angle, in which said first and second SAR acquisitions are interleaved at PRI level (namely, a first SAR acquisition always alternates with a second SAR acquisition) and said first and second elevation angles are different from each other. In other words, a first SAR acquisition is performed using the first elevation angle, then, at a temporal distance $PRI_{op}=1/PRF_{op}=1/(2PRF_{nom})$, a second SAR acquisition is performed using the second elevation angle, then, always at a temporal distance $PRI_{op}=1/PRF_{op}=1/(2PRF_{nom})$, a first SAR acquisition is performed again using the first elevation angle and so on, always alternating the execution of a first SAR acquisition with the execution of a second SAR acquisition and spacing the different acquisitions by a time period $PRI_{op}=1/PRF_{op}=1/(2PRF_{nom})$. In this way, the SAR sensor on board the satellite 30 is able to observe two distinct swaths (as shown in FIG. 4).

It is important to note that the acquisitions regarding a same swath are performed with the nominal pulse repetition frequency $PRF_{nom}$ of the antenna, i.e. the first SAR acquisitions are performed with the nominal pulse repetition frequency $PRF_{nom}$ of the antenna and the second SAR acquisitions are also performed with the nominal pulse repetition frequency $PRF_{nom}$ of the antenna. In this way, azimuth ambiguity values are not altered.

More in general, since the operational pulse repetition frequency $PRF_{op}$ used is N times (two times in the example in FIG. 4) greater than that required/nominal $PRF_{nom}$, the individual acquisitions will have nominal PRFs, and therefore all product quality parameters will remain unaltered. To all intents and purposes, the technique of SAR acquisition in stripmap mode according to the first aspect of the present invention enables separating the swath in range into N swaths of reduced size (approximately 1/N) without altering the other parameters, such as the azimuth resolution for example.

All N SAR acquisitions can be performed using a same squint angle, or each SAR acquisition can be performed using a respective squint angle different from that used for performing the other N−1 SAR acquisitions so as to obtain, for each acquisition, an integration time equal to the standard stripmap one.

Therefore, the technique of SAR acquisition in stripmap mode according to the first aspect of the present invention enables serving two (or N in the generic case) users interested in areas of medium extension and separated from one another in the elevation plane. With the traditional stripmap technique, these requests would be in conflict and therefore it would not be possible to serve them simultaneously.

In order not to alter the image quality parameters, the PRF used with the technique according to the first aspect of the present invention is greater than the natural one of the antenna. By increasing the PRF, the swaths in range that can be acquired are smaller. Thus, a second aspect of the present invention regards a technique of SAR acquisition in stripmap mode that does not use an increased PRF, or in any case not increased by a factor of N, so as to control the effects on the product and manage the induced degradation.

In particular, said second aspect of the present invention relates to a so-called burst-mode stripmap technique that is not interleaved at PRI level, i.e. where the N stripmap acquisitions are not performed by varying the antenna's acquisition direction in elevation at PRI level, but by varying the antenna's acquisition direction in elevation in PRI blocks.

Specifically, the second aspect of the present invention concerns a burst-mode stripmap technique in which the N stripmap acquisitions are performed without increasing the PRF and by varying the acquisition elevation direction of the antenna, i.e. the elevation angle used, in PRI blocks.

The burst-mode stripmap technique with uncreased PRF and variation of the elevation angle according to the second aspect of the present invention enables extending the swath in range, even to the point of doubling it.

In order to divide the acquisition in two (N in the generic case) and assuming to use the natural nominal PRF of the antenna used, "holes" are introduced in the acquisition scheme. If these holes do not have periodic characteristics, the effect will be a distributed raising of all the lateral lobes, i.e. the ISLR (Integrated Side Lobe Ratio) parameter deteriorates, but not the PSLR (Peak Side Lobe Ratio). Vice versa, by using periodic execution patterns for the two (N in the generic case) types of acquisition, paired echoes in a known position are created. Depending on requirements, various solutions can be chosen and then a given pattern applied in the acquisition logic. Since a lower number of samples will be integrated, the product will have an impaired NESZ (Noise Equivalent Sigma Zero) parameter.

Figure 5:
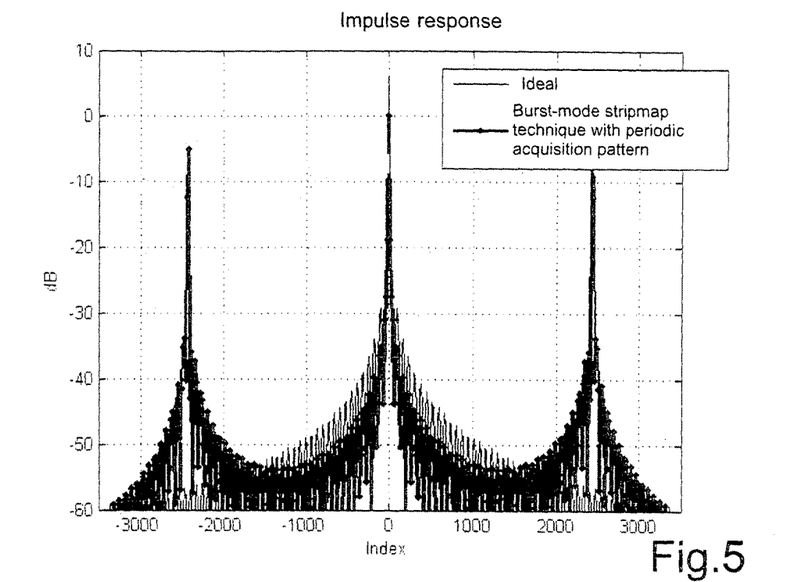
FIGS. 5 and 6 schematically show effects of applying a first acquisition strategy in performing a technique of SAR acquisition in stripmap mode according to a second aspect of the present invention.
Figure 6:
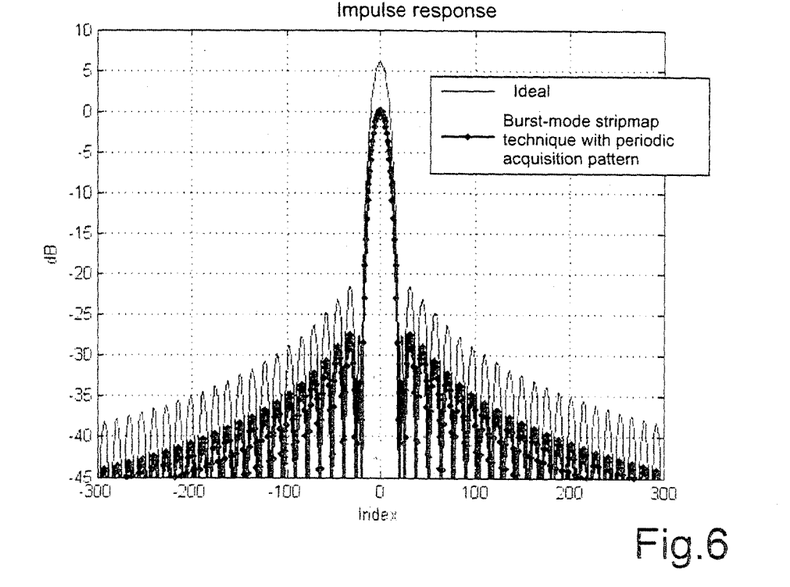
Figure 7:
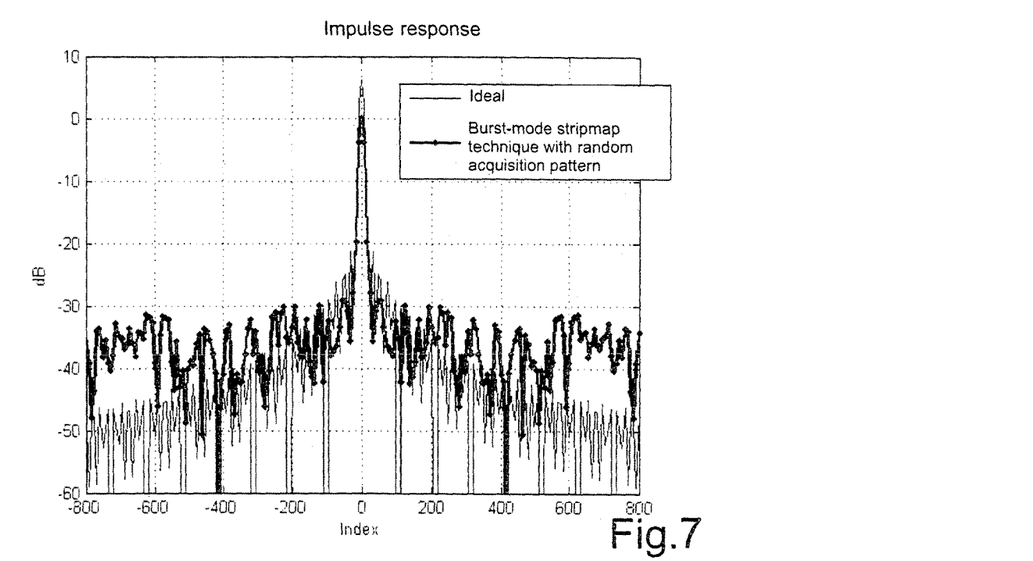
FIGS. 7 and 8 schematically show effects of applying a second acquisition strategy in performing the technique of SAR acquisition in stripmap mode according to the second aspect of the present invention.
Figure 8:
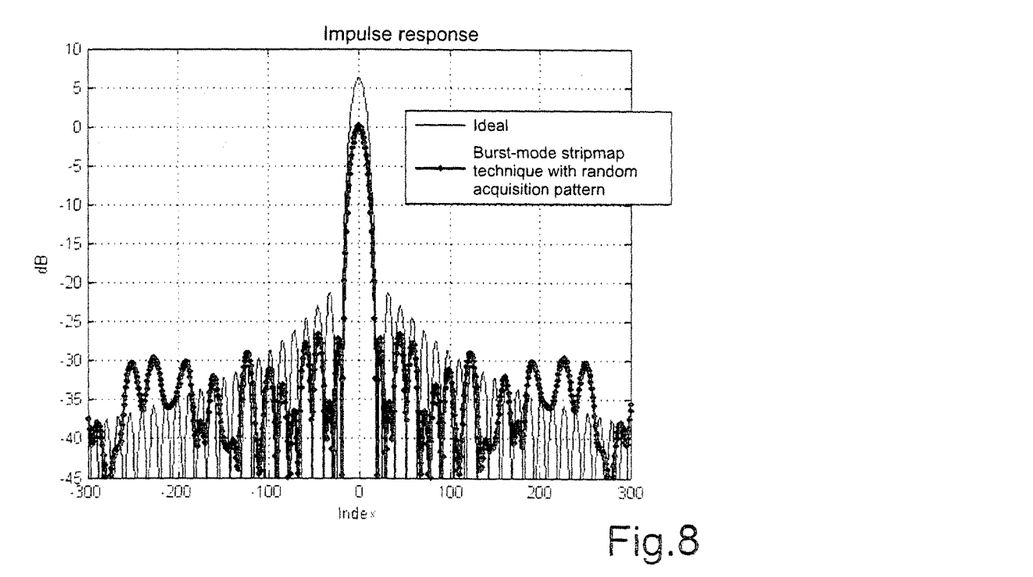

By way of example, FIGS. 5 and 6 show the effects of applying a periodic execution pattern of the N types of acquisition with the burst-mode stripmap technique with uncreased PRF according to the second aspect of the present invention, while FIGS. 7 and 8 show the effects of applying a random execution pattern of the N types of acquisition with the burst-mode stripmap technique with uncreased PRF according to the second aspect of the present invention.

With respect to the technique according to the first aspect of the present invention, the technique according to the second aspect introduces less technological constraints because the switching of the antenna beam takes place at a considerably lower frequency.

Briefly summarizing, the present invention concerns:
the use of a PRF increased by a factor of N and the interleaved use of N different elevation angles at PRI level to observe N separate swaths with the same azimuth resolution (in particular, each of the N swaths is observed with the nominal azimuth resolution of the traditional stripmap mode (i.e. L/2)); and
the use of an uncreased PRF and the burst use of N different elevation angles to extend the swath in range by a factor of N (i.e. enabling the observation of N swaths, each of which has a size comparable to those of swaths observed via conventional stripmap mode acquisitions) with the same azimuth resolution (in particular, each swath is observed with the nominal azimuth resolution of the traditional stripmap mode (i.e. L/2)).

It is important to underline the fact that the present invention enables performing N "continuous" stripmap acquisitions (i.e. with integration times equal to those of the traditional stripmap mode), thereby obtaining, for each swath, the nominal maximum azimuth resolution of the traditional stripmap mode (i.e. L/2)); in particular, according to the first aspect of the present invention, each acquisition is performed with the nominal PRF of the antenna of the SAR sensor used.

In conclusion, the present invention exploits multi-beam acquisition logics that enable simultaneously acquiring areas that are non-contiguous in the direction orthogonal to the flight direction of the SAR sensor, unlike the traditional spotlight and stripmap techniques that, on the contrary, do not allow simultaneously observing several swaths.

The present invention therefore not only increases the range of products for systems already produced, but, above all, introduces a new methodology for designing new SAR systems.

Finally, after having compared the present invention with the traditional spotlight and stripmap modes, the main differences from the known techniques of high-resolution wide-swath SAR image generation previously described will now be described as well.

In particular, unlike the present invention, the burst techniques (e.g. ScanSAR and TOPS) envisage deterioration of azimuth resolution in order to increase the swath in range.

Unlike the present invention, which functions with a single receiving channel (i.e. with a single receiver), the space-division techniques (e.g. DPC and HRWS) and the angle-division ones (e.g. MEB and SPCMB) envisage the use of M systems for simultaneous reception and also envisage the use of a small antenna (typically, an antenna is partitioned into M smaller antennas).

The BiDi mode described in Ref1 has a different purpose, that of Moving Target Identification (MTI) and therefore does not have the object of observing several swaths in range. Furthermore, the acquisition geometry is different from that of the present invention; beam switching actually takes place on the azimuth plane and not on the elevation plane.

Furthermore, it should also be noted that Ref2 has antenna-level implementation logic and not acquisition logic as the present invention. In addition, as can be inferred from FIG. 3 of Ref2, the acquisitions are separated by a significant space with respect to the antenna's swath and have repeatability characteristics. The bursts do not guarantee continuous sampling of the azimuth spectrum with the natural frequency (PRF) of the antenna, i.e. there is no temporal continuity in the bursts regarding a same swath and therefore, unlike that envisaged by the present invention, the best achievable azimuth resolution is worse than the nominal one of the stripmap mode (i.e. L/2). In particular, the geometry shown in FIG. 3 of Ref2 is that typical of the ScanSAR mode, which, as just said, enables observing multiple swaths, but with azimuth resolutions worse than the nominal resolution of the stripmap mode (i.e. L/2) and, consequently, worse than those obtained for the various swaths by the present invention.

Finally, it should also be noted that section 5 of Ref3 also presents the ScanSAR mode, i.e. a mode that acquires multiple sub-swaths in range with bursts that are not contiguous in time. The bursts are sequential and of shorter duration with respect to those obtainable in stripmap mode, and therefore, contrary to that envisaged by the present invention, there is deterioration in azimuth resolution with reference to the nominal resolution of the stripmap mode (i.e. L/2). Furthermore, FIG. 10 of Ref3 does not show acquisition logic, but only describes the PRF values that can be chosen depending on the distance of the scene. In particular, according to that shown in FIG. 10 of Ref3, synchronous and spaced out bursts are envisaged on the individual areas in range, thereby forcing degradation of azimuth resolution. In addition, FIG. 8 of Ref3 illustrates the traditional ScanSAR mode that, as previously indicated, enables observing multiple swaths, but with azimuth resolutions worse than the nominal resolution of the stripmap mode (i.e. L/2) and, consequently, worse than those obtained for the various swaths by the present invention.

In conclusion, it is clear that various modifications can be applied to the present invention without departing from the scope of the invention, as defined in the appended claims.

The invention claimed is:

1. SAR imaging method comprising performing N SAR acquisitions in stripmap mode of areas of the earth's surface by means of a synthetic aperture radar that is transported by an aerial or satellite platform (30) and which comprises a single, non-partitioned antenna and a single receiver coupled to said single, non-partitioned antenna, N being an integer greater than one;
  wherein the single, non-partitioned antenna of the synthetic aperture radar is associated with a nominal pulse repetition frequency;
  wherein each SAR acquisition in stripmap mode is performed using a respective squint angle with respect to the flight direction of the synthetic aperture radar, said respective squint angle being equal to, or different from, the squint angles used for performing the other N-1 SAR acquisitions in stripmap mode;
  wherein each SAR acquisition in stripmap mode is performed using a respective elevation angle with respect to the nadir of the synthetic aperture radar, said respective elevation angle being different from the elevation angles used for performing the other N-1 SAR acquisitions in stripmap mode, thereby resulting in that each SAR acquisition in stripmap mode is related to a respective swath of the earth's surface which is different from the swaths observed via the other N-1 SAR acquisitions in stripmap mode;
  wherein each performed SAR acquisition in stripmap mode comprises respective radar transmission and reception operations that:
    are time interleaved, individually or in groups, with single, or groups of, radar transmission and reception operations of the other N-1 SAR acquisitions in stripmap mode performed; and
    comprise the transmission and reception of respective radar beams in respective acquisition directions that are defined by the respective squint angle and by the respective elevation angle used for said SAR acquisition in stripmap mode, thereby resulting in that said respective acquisition directions are parallel to each other and not parallel to the acquisition directions of the other N-1 SAR acquisitions in stripmap mode performed;
  wherein the radar transmission and reception operations are performed by:
    using an operational repetition frequency that is increased by a factor of N with respect to the nominal pulse repetition frequency; or
    a burst use of the N different elevation angles to extend the swath in range by a factor of N;
  the method further comprising generating, on the basis of each SAR acquisition in stripmap mode performed, SAR images of areas of the respective swath observed via said SAR acquisition in stripmap mode;
  wherein all the generated SAR images have one and the same azimuth resolution that is equal to half the physical or equivalent length along the azimuth direction of the single, non-partitioned antenna of the synthetic aperture radar.

2. The method of claim 1, wherein the respective radar transmission and reception operations of each performed SAR acquisition in stripmap mode are individually time interleaved with single radar transmission and reception operations of the other N-1 SAR acquisitions in stripmap mode performed;
  and wherein the radar transmission and reception operations are performed with an operational repetition frequency equal to N times the nominal pulse repetition frequency so that each of the N SAR acquisitions in stripmap mode is performed with the nominal pulse repetition frequency.

3. The method of claim 1, wherein the respective radar transmission and reception operations of each performed SAR acquisition in stripmap mode are time interleaved, in groups, with groups of radar transmission and reception operations of the other N-1 SAR acquisitions in stripmap mode performed;
  and wherein the radar transmission and reception operations are performed with an operational repetition frequency comparable to the nominal pulse repetition frequency.

4. The method of claim 3, wherein the groups of radar transmission and reception operations of the N different SAR acquisitions in stripmap mode are time interleaved according to a periodic or random interleaving pattern.

5. Synthetic aperture radar system that comprises a single, non-partitioned antenna and a single receiver coupled to said single, non-partitioned antenna; and that is configured to perform the SAR imaging method claimed in claim 1.

* * * * *